(12) United States Patent
Zahavi

(10) Patent No.: US 7,024,517 B1
(45) Date of Patent: *Apr. 4, 2006

(54) SYSTEM AND METHOD FOR CONFIGURING DATA STORAGE IN ACCORDANCE WITH WORKLOAD REQUIREMENTS

(75) Inventor: William Zahavi, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 924 days.

This patent is subject to a terminal disclaimer.

(21) Appl. No.: 09/965,431

(22) Filed: Sep. 27, 2001

(51) Int. Cl.
*G06F 12/00* (2006.01)

(52) U.S. Cl. ............... 711/114; 711/170; 711/113

(58) Field of Classification Search ........... 711/114, 711/113, 170
See application file for complete search history.

(56) References Cited

U.S. PATENT DOCUMENTS

| 5,206,939 | A | * | 4/1993 | Yanai et al. ............... 711/4 |
| 5,491,511 | A | | 2/1996 | Odle |
| 5,623,598 | A | * | 4/1997 | Voigt et al. ............... 714/47 |
| 6,078,990 | A | * | 6/2000 | Frazier ............... 711/114 |
| 6,101,497 | A | * | 8/2000 | Ofek ............... 707/10 |

* cited by examiner

*Primary Examiner*—Reginald G. Bragdon
(74) *Attorney, Agent, or Firm*—Krishnendu Gupta; Robert Kevin Perkins

(57) ABSTRACT

This invention is a system and method for configuring data storage in accordance with workload requirements. The method of this invention allows management and planning for data storage system requirements based on user or administrator defined requirements. It also allows such a user or administrator to iteratively adjust and balance tolerances for performance thresholds or capacity parameters against each other. The invention provides an easy to use user interface that simplifies the configuration and planning task and eases restrictions on the amount of experience and knowledge that a user of the tool needs to achieve a satisfactory data storage solution.

33 Claims, 16 Drawing Sheets

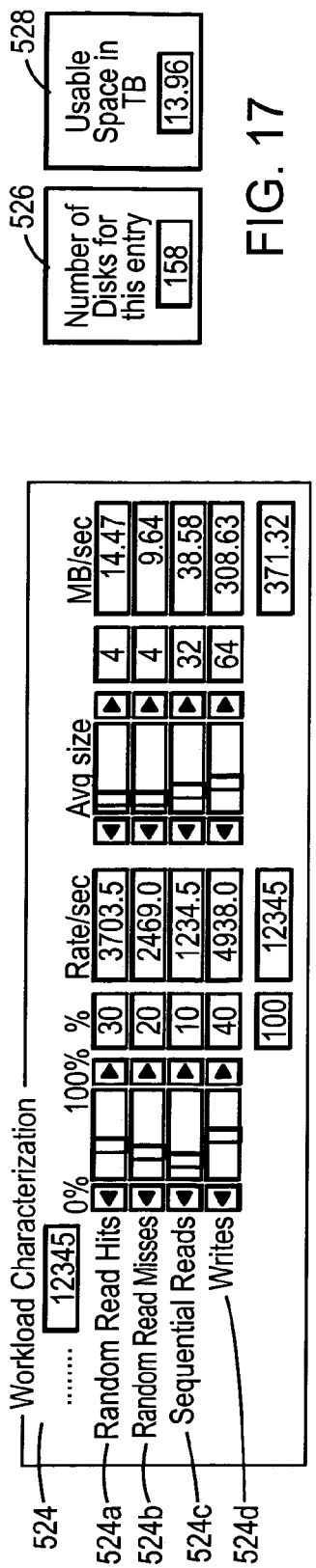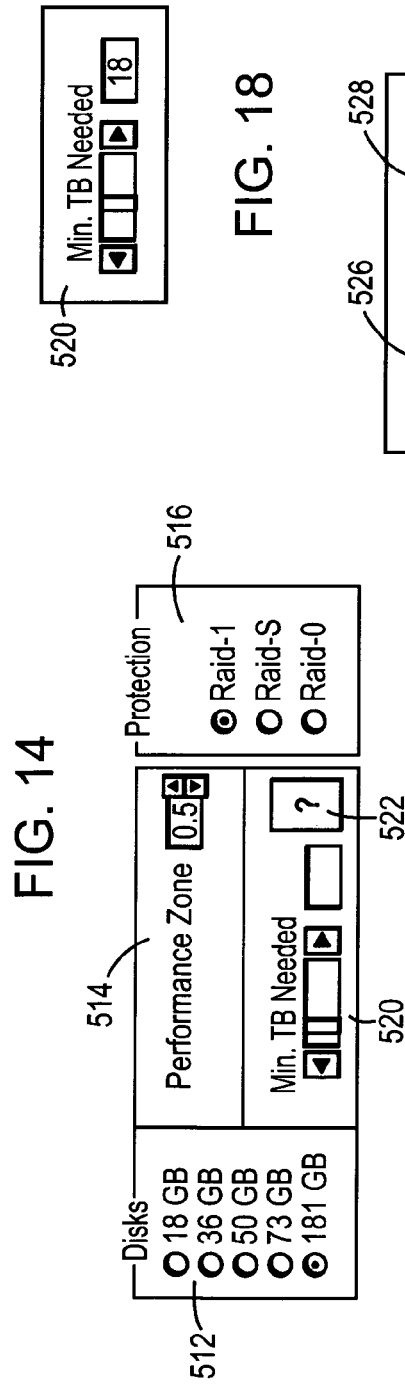

SYSTEM AND METHOD FOR CONFIGURING DATA STORAGE IN ACCORDANCE WITH WORKLOAD REQUIREMENTS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to managing data in a data storage environment, and more particularly to a system and method for configuring data storage in accordance with workload requirements.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. Mass storage systems particularly those of the disk array type have centralized data as a hub of operations all driving down costs. But performance demands placed on such mass storage have increased and continue to do so.

Design objectives for mass storage systems typically include cost, performance, and availability. Objectives typically included are a low cost per megabyte, a high I/O performance, and high data availability. Availability is measured by the ability to access data. Often such data availability is provided by use of redundancy such as well-known mirroring techniques.

One problem encountered in the implementation of disk array data storage systems concerns optimizing the storage capacity while maintaining the desired availability and reliability of the data through redundancy. It is important to allocate as closely as possible the right amount of storage capacity with going over or under significantly because of cost and necessity but this is a complex task. It has required a great deal of skill and knowledge about computers, software applications such as databases, and the very specialized field of data storage. Such requisite abilities have long been expensive and difficult to access. There remains and probably will be an increasing demand for and corresponding scarcity of such skilled people.

Determining the size and number of disk array or other data storage system components needed by a customer requires information about both space, traffic and a desired quality of service. It is not sufficient to size a solution simply based on the perceived quantity of capacity desired, such as the number of terabytes believed to be adequate.

There is a long-felt need for a computer-based tool that would allow a straight-forward non-complex way to allocate proper storage capacity while balancing cost, growth plans, workload, and performance requirements. This would be advancement in the computer arts with particular relevance in the field of data storage.

SUMMARY OF THE INVENTION

The present invention is a system and method for configuring data storage in accordance with workload requirements. The method of this invention allows management and planning for data storage system requirements based on user or administrator defined requirements.

An advantage of this invention is that it allows such a user or administrator to iteratively adjust and balance tolerances for performance thresholds or capacity parameters against each other. The invention provides an easy to use user interface that simplifies the configuration and planning task and eases restrictions on the amount of experience and knowledge that a user of the tool needs to achieve a satisfactory data storage solution. In one embodiment it allows a user, administrator, or other configurator to integrate the space and traffic needs of a business along with performance goals such that the resulting configuration can handle the workload in a manner that meets a desired quality of service (e.g. based on performance, cost and availability requirements).

BRIEF DESCRIPTION OF THE DRAWINGS

The above and further advantages of the present invention may be better under stood by referring to the following description taken into conjunction with the accompanying drawings in which:

FIG. 14 is another exemplary representation of a user interface screen for using this invention;

FIG. 15 is another exemplary representation of a user interface screen for using this invention;

FIG. 17 is another exemplary representation of a user interface screen for using this invention;

FIG. 18 is another exemplary representation of a user interface screen for using this invention;

FIG. 19 is another exemplary representation of a user interface screen for using this invention.

DETAILED DESCRIPTION OF THE PREFERRED EMBODIMENT

The methods and apparatus of the present invention are intended for use with data storage systems, such as the Symmetrix Integrated Cache Disk Array system available from EMC Corporation of Hopkinton, Mass. Specifically, this invention is directed to a configuration method and system for storage capacity planning based on user or administrator defined workload requirements.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The Logic for carrying out the method is embodied as part of the system described below beginning with reference to FIGS. 1–2. One aspect of the invention is embodied as a method that is described below with reference to FIGS. 4–12. Although, not limited to this theory, at least one basis of the invention relies on the inventor's critical recognition of the applicability of a particular utilization curve shown in FIG. 3. User Interface Screens for using the invention are shown in FIGS. 13–20.

Figure 1:
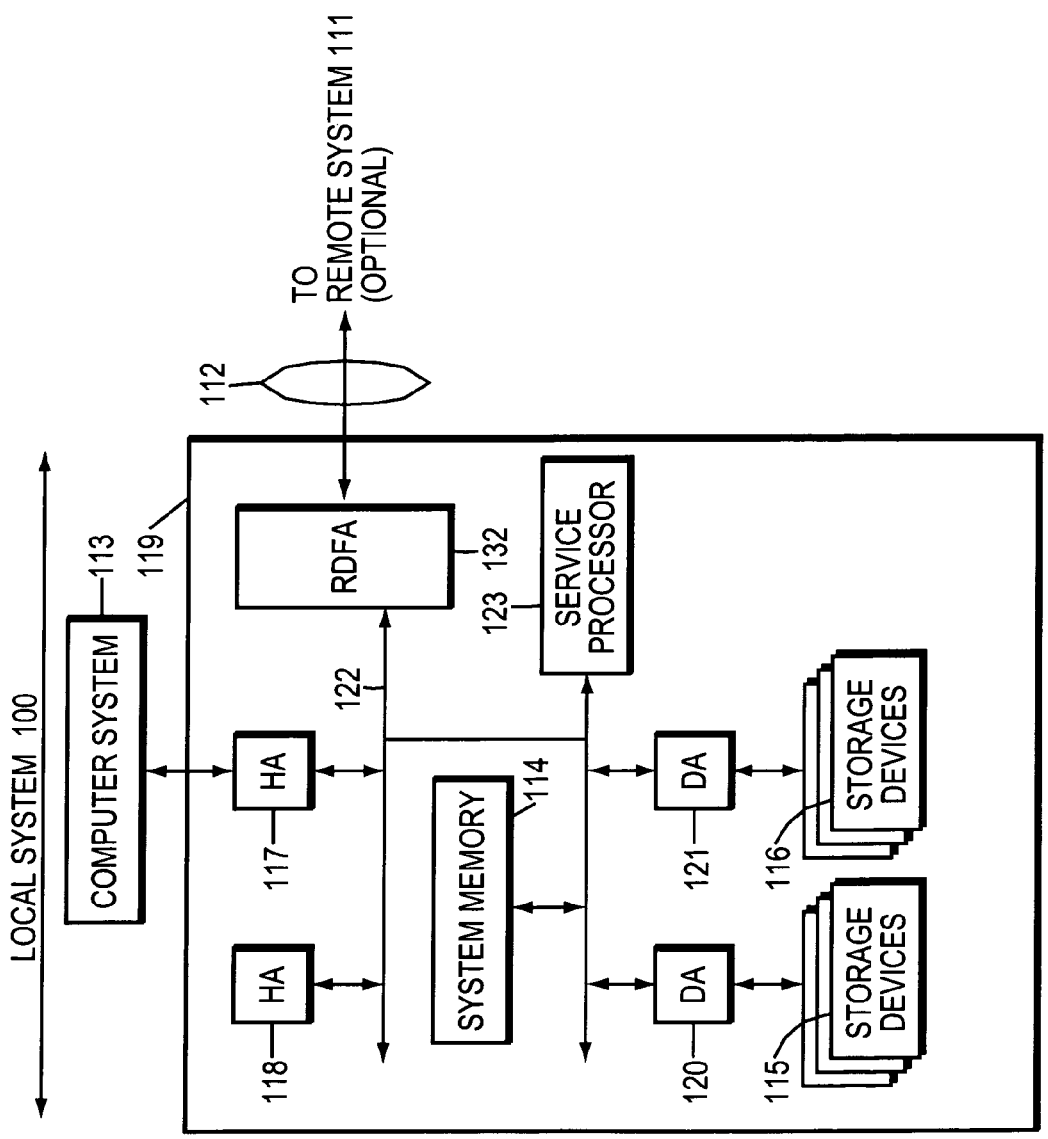
FIG. 1 is a block diagram of a data storage network for which Logic (FIG. 2) that is part of the computer system shown in FIG. 1 is particularly useful.

Referring now to FIG. 1, reference is now made to a network or local system 100 for which the invention is particularly useful and includes a data storage system 119 in communication with a computer system 113. Logic for enabling the invention resides on computer 113 (FIG. 2). Although the computer system is shown conveniently in communication with the data storage system this is optional because the invention is particularly useful for planning and configuring such a data storage system pre-operationally.

In a preferred embodiment the data storage system to be configured is a Symmetrix Integrated Cache Disk Arrays available from EMC Corporation of Hopkinton, Mass. However, it will be apparent to those with skill in the art that there is no limit to the use of this invention for any system including data storage. Nevertheless, regarding the preferred embodiment, such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

The data storage system 119 includes a system memory 114 and sets or pluralities 115 and 116 of multiple data storage devices or data stores. The system memory 114 can comprise a buffer or cache memory; the storage devices in the pluralities 115 and 116 can comprise disk storage devices, optical storage devices and the like. However, in a preferred embodiment the storage devices are disk storage devices. The sets 115 and 116 represent an array of storage devices in any of a variety of known configurations.

A computer or host adapter (HA) 117 provides communications between the host system 113 and the system memory 114; disk adapters (DA) 120 and 121 provide pathways between the system memory 114 and the storage device pluralities 115 and 116. Regarding terminology related to the preferred Symmetrix system, from the HA toward the computer or host is sometimes referred to as the front end (FE) and from the DA's toward the disks is sometimes referred to as the back end (BE). A bus 122 interconnects the system memory 114, the host adapters 117 and 118 and the disk adapters 120 and 121. Although not shown such a bus could be used with switches to provide discrete access to components of the system 119. Communication link 112 may provide optional access through remote data facility adapter (RDFA) 132 to remote system 111 (not shown). Remote systems and related adapters are discussed in the incorporated '497 patent.

Each system memory 114 is used by various elements within the respective systems to transfer information and interact between the respective host adapters and disk adapters. A service processor 123 may also be used in communication with system memory 114 particularly for maintenance and service needs.

Figure 2:
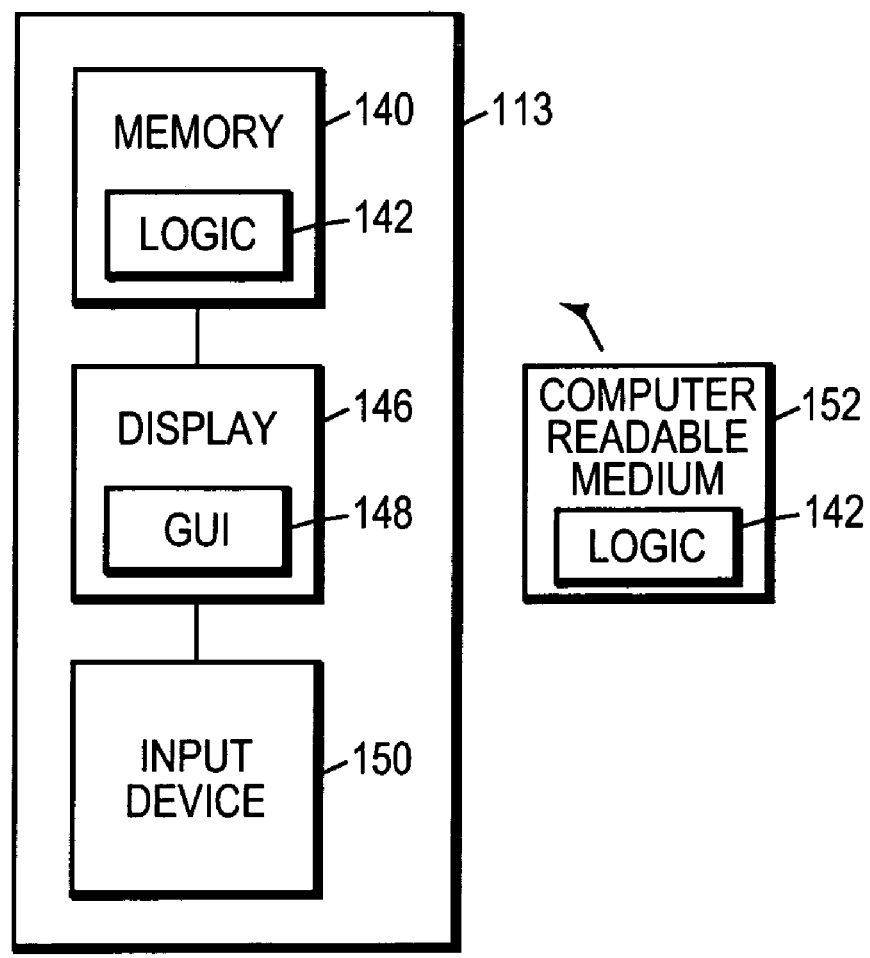
FIG. 2 shows the computer system of FIG. 1 including the Logic of the preferred embodiment and including a computer-readable medium encoded with the logic for enabling the method of the present invention.

FIG. 2 shows a general purposed digital computer 113 including memory 140 (e.g., conventional electronic memory) in which is stored Logic 142 that enables the method of the invention (FIGS. 4–12) and enables display of user screens on display 146 to comprise GUI 148. The general-purpose digital computer becomes a specialized unique and novel machine because of Logic 142, which in a preferred embodiment is software but may be hardware. Logic 142 may also be stored and read for operation on computer readable medium 152. A user input device, such as a well-known mouse or keyboard allows the user to interface with the computer including its special logic.

Figure 3:
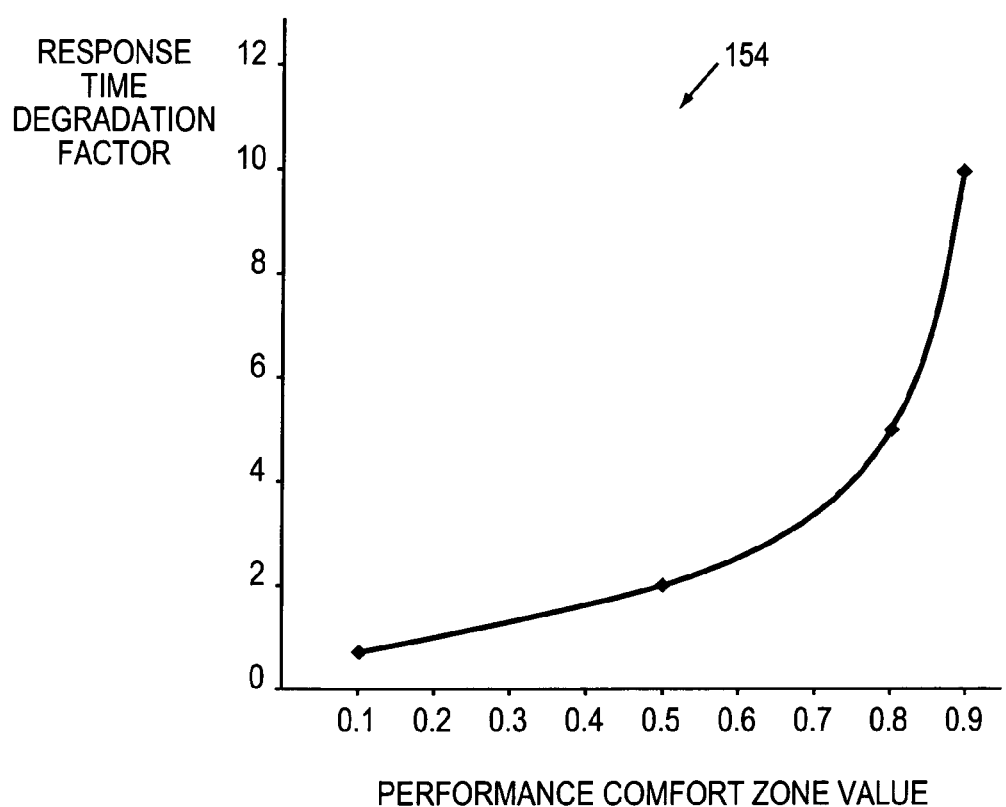
FIG. 3 is an exemplary representation of a relationship used with the Logic of the preferred embodiment shown in FIG. 2.

FIG. 3 shows a graph of relationship 154 that illustrates a special utilization curve that the inventor has critically recognized to be an important tool for implementing the method of this invention. The ordinate or "y" axis shows Response Time Degradation Factor (RTDF) that is relative to time to service a request for a data operation. The abscissa or x axis shows a Performance Comfort Zone Value (Performance Zone or PZV) that is relative to the performance characteristics that user may desire for a data storage system (e/g., MB/sec data retrieval rates). The interrelationship of RTDF and PZV is important. For example, changing the PZV implies that the user would like the complement to be run at a higher utilization level. But the higher the utilization level, the higher the possibility of contention for the device and thus the higher the response times. Increasing the PZV will decrease the number of components in the configuration, thus reducing cost. On the other hand increasing the number of components will increase costs while providing better performance.

METHOD STEPS OF THE INVENTION

Now for a better understanding of the method steps of this invention the steps are described in detail with reference to FIGS. 4–12, which are explained with reference to user interface display screens shown in FIGS. 13–20.

Figure 13:
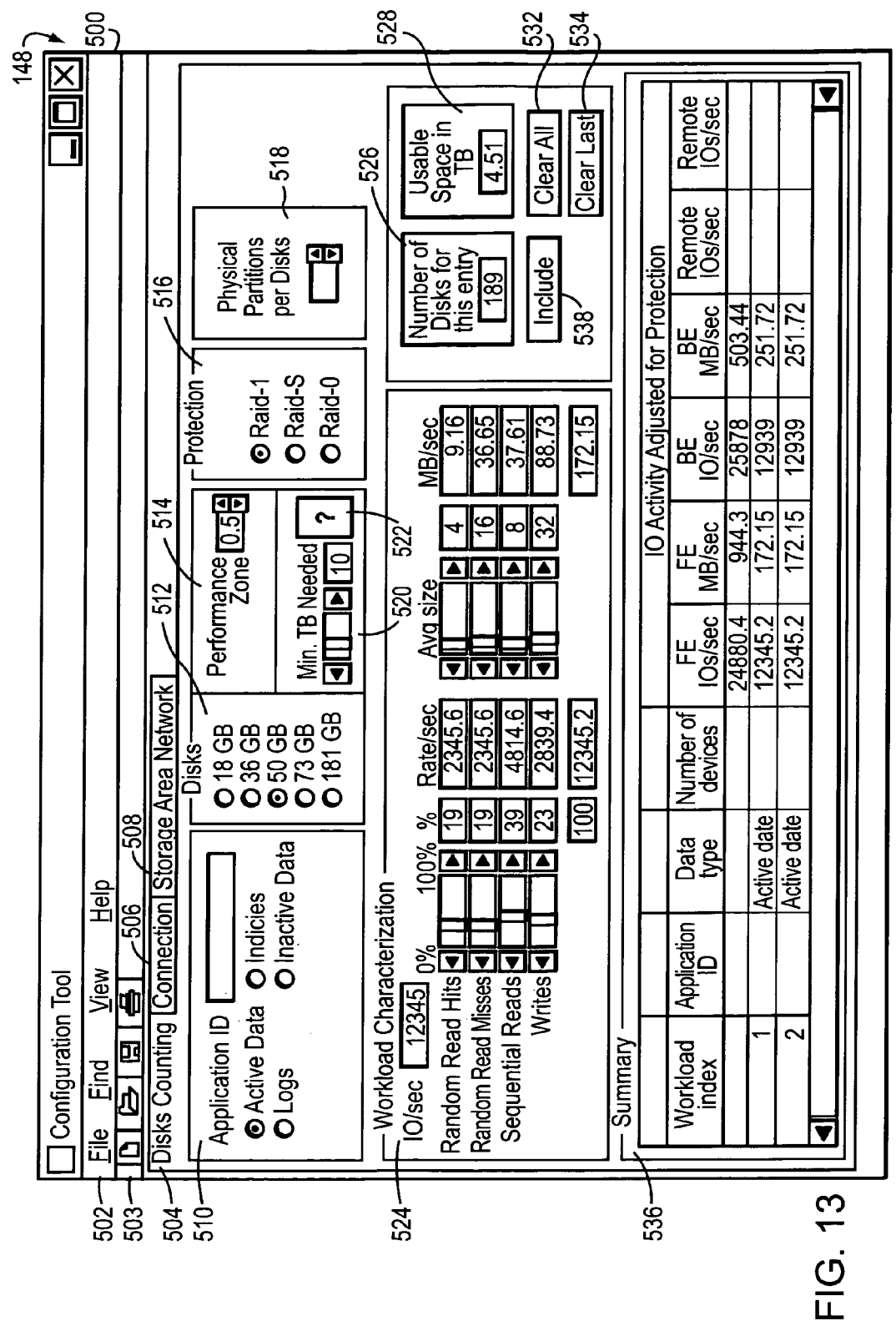
FIG. 13 is an exemplary representation of a user interface screen for allowing use of this invention.

Referring to FIG. 13, exemplary user screen 500 that is part of GUI 148 and maybe used by a user (not shown) to invoke and use the logic of the invention. Menu bar 502 includes the following functions: File, Edit, View, and Help. Graphical menu selections 503 include Open a New Document, Open a File, Save a File, and Print.

Tab 504 in this example is denoted as "Disks Counting." Information related to this tab is shown in FIG. 13. Tabs 506 and 508 refer to, respectively, "Connectivity," and "Storage Area Network," which are also discussed below.

Screen area 580 includes fields for entering Application ID, and fields for indicating "Active Data", "Indices," "Logs," and "Inactive Data." Screen area 512 includes fields for designating the data capacity of the disk drives to be used, e.g., 18 gigabytes (GB), 36 GB, 50 GB, 73 GB, and 181 GB. Screen area 514 includes an area to enter a Performance Zone Value discussed with reference to FIG. 3. Screen area 520 allows the user to directly indicate the minimum terabytes (TB) needed or desired and which may be adjusted by clicking on and moving the slider button. Screen area 518 allows the user to indicate the number physical partitions per disk. Screen area 522 is a convenient help invoking icon specific to the screen area where user may be working and Screen areas 532 and 534, include respectively, a "Clear All," and "Clear Last" button.

Screen area 516 includes a field for the user to indicate the protection scheme to be used, e.g., Raid-1, Raid-S, and Raid-0, or others not listed in the example for the sake of simplicity. Raid protection schemes are well known, but for the sake of completeness are now discussed briefly. A paper from the University of California at Berkeley and entitled "A Case For Redundant Arrays Of Inexpensive Disk (RAID)", Patterson et al., Proc. ACM SIGMOD, June 1988, generally describes this technique. Raid-1 architecture is essentially well-known disk mirroring. In disk mirroring identical copies of data are sent to redundant or mirroring disks. Such disk redundancy provides robust protection but increases cost. On the other hand, Raid-0 provides no protection at all and adds no cost for redundancy. More advanced Raid schemes than Raid-1 provide bit striping and XOR calculations for parity checking. For example, EMC Symmetrix employs a Raid scheme known as Raid-S, wherein a parity calculation is based on an Exclusive Or (XOR) boolean logic function. The XOR instruction is used to compare binary values of two data fields. The result is then XOR'd with the binary values of data that produces resultant parity binary value. Then a Raid rebuild may use the XOR to reconstruct the missing data.

Referring again to FIG. 13, the user may use Workload Characterization screen area 524 to indicate type and/or size of traffic, e.g., IO's per second. Type of traffic may include random read hits, random read miss, sequential reads, and writes. A write operation means data is requested to be placed on the disk whereas a read operation means data is requested to be viewed but not changed and typically this involves loading from disk or electronic memory such as cache. Such cache or system memory is often employed to avoid mechanical lags associated with actual disk reads or writes. A random read hit means that data requested to be read from a random request was found in cache. On the other hand a random read miss means the data was not found in cache in response to a similar request. Sequential reads refers to a situation where a read request following an immediate preceding request is for data stored on disk in an immediately following sequence such as a data block. In such a case, cache can be used quite effectively to avoid going to disk, in particular by pre-fetching a certain amount of sequentially arranged data from disk into cache.

The invention uses such information to advise a user on how to configure data storage systems having good capabilities to meet his needs, and while also considering traffic, other workload characteristics, and user defined Performance Zone Values. The invention allows for the integration of space and traffic needs of a business along with performance goals such that the resulting configuration can handle the workload in a manner that meets a desired quality of service.

Returning again to FIG. 13, screen area 526 indicates the number of disk for the entry defined by the workload characterization and other information given. Screen area 528 defines the usable space in terabytes based on these other variables and parameters just discussed. Conveniently screen area 536 provides a summary. The IO activity is adjusted for the protection scheme selected using screen area 516. Summarized information may include data type, traffic requirements such as IO's per second and performance characteristics such as MB per second for both front end (FE) and back end (BE), which are characteristics of the preferred data storage system and EMC Symmetrix.

Figure 4:
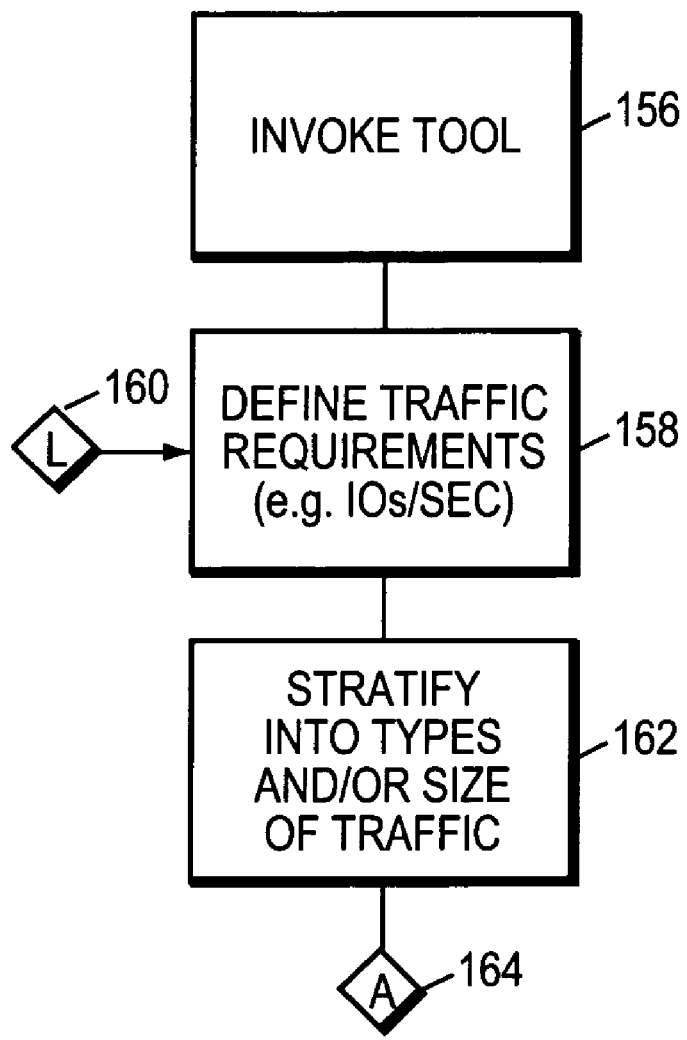
FIG. 4 is a flow logic diagram illustrating some method steps of the invention carried out by the logic of this invention.

Referring to FIG. 4, step 156 invokes for operation of the Logic of FIG. 2. In step 158, the user uses the GUI 148 to define traffic requirements, e.g., IO's per second. This can be done either as a bulk IO requirement or as the IO requirements decomposed into individual applications, threads, volume-groups, or any other logical separation of work into business units available to the user. The IO rate assigned to a business unit is then stratified into the types and sizes of the traffic in step 162. Disk counting, i.e., allocating and accounting for disks needed for such stratifications is also performed by the Logic. Step 160 "L" shown in FIG. 4 is invoked in accordance with answers to inquiries posed as part of the steps described with reference to FIG. 11 below. Continuation step 164 "A" flows into FIG. 5—shown steps.

Figure 5:
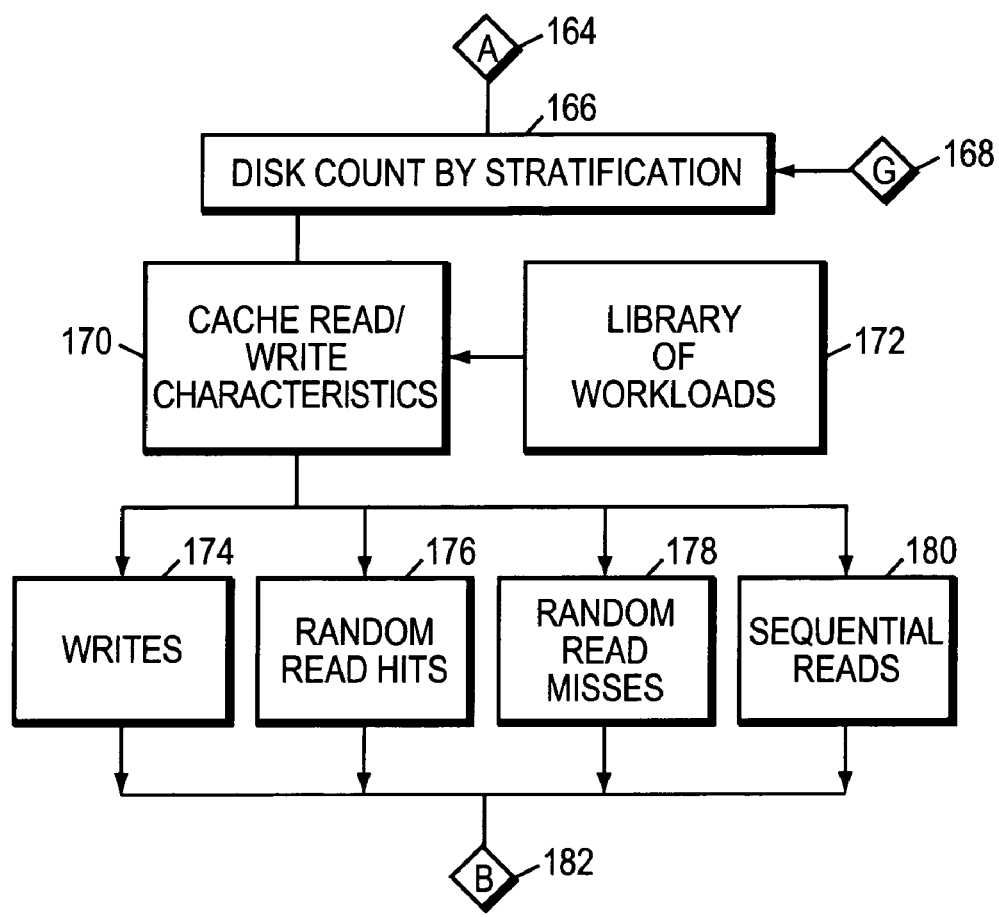
FIG. 5 is another flow logic diagram illustrating method steps of the invention carried out by the logic of this invention.

Reference is now made to FIGS. 5 and 14. In using the invention, the user needs to provide through the user interface information identifying what percent of this work is Random-Read Hit, Random-Read Miss, Sequential Read, and Writes (discussed below). FIG. 14 shows an enlargement of screen area 524, including random Read Hits field 524a, Random Read Miss field 524b, Sequential Reads field 524c, and Writes field 524d. One approach to establishing these percentages is to first determine the Read/Write ratio as one way to establish Read/Write Characteristics (FIG. 5, step 170). The user may determine this from knowledge of the application transactions or from a Workload Library (FIG. 5, step 172).

Once this ratio is established the user may attempt to determine what portion of the read activity is sequential.

Sequential reads are generally almost 100% cache hits unless they come in bursts of small sequences. Again, this requires knowledge of the application or information from a Workload Library. Of the remaining reads, it is a good choice to select as a first approximation to a 25% hit rate to random read activity. A distinct IO size can be assigned to each type of IO of the business unit. Upon starting an entry for a business unit the reminder to include this work in the total summary table is done by highlighting the 'Include' button 538 (FIG. 13) in a preferred embodiment.

Referring to FIG. 14, the sliding scale from zero percent to 100 percent allows the user to vary the parameters discussed above (such as Random Read Hits). Given the workload characterization IO's per second (12345 IO's/sec in this example) and using the percentage ratio, the Logic can determine the rate per second for each operation. For example if Random Read Hits are 30 percent of the I0 traffic rate then the rate per second for random read hits is 3703.5 in this example (0.3 times 12345). This type of information is conveniently presented to the user via user screen 500 (FIG. 13). Also the logic determines, based on the average I/O size in kilobytes, the transfer rate in MB per second.

Referring to FIG. 5, continuation step "A" 164 flows into step 166 that is a disk count by stratification. This includes cache Read/Write characteristics in step 170 that may come from library workloads shown in step 172 and discussed above. This leads to steps 174, 176, 178, and 180, respectively including the above-discussed Read/Write Ratio, Random Read Hits, Random Read Miss, and Sequential Reads user defined stratifications. Step 168 "G" shown in FIG. 5 is explained with reference to FIG. 11 below. Continuation step 182 "B" flows into the FIG. 6—shown flow logic diagram.

Figure 6:
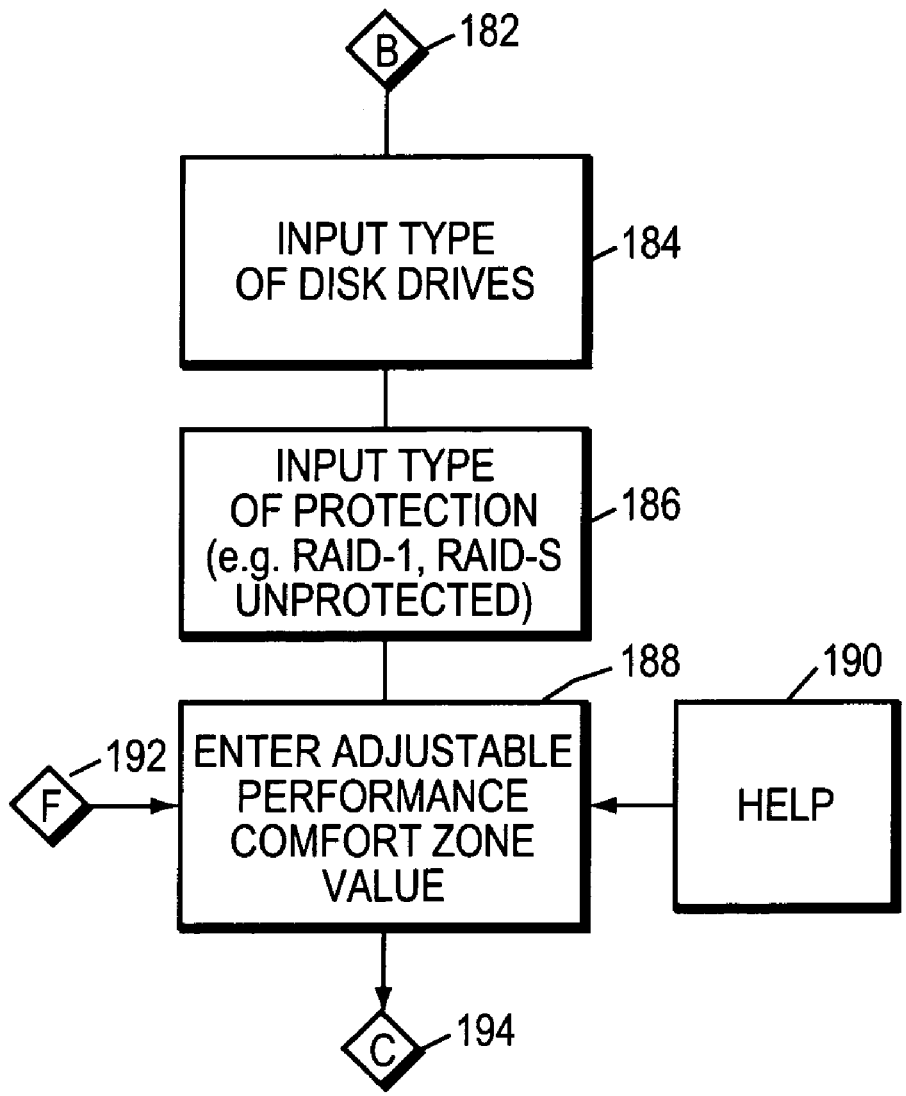
FIG. 6 is another flow logic diagram illustrating method steps of the invention carried out by the logic of this invention.

Referring to FIG. 6, the user may include type of disk drives in step 184 using the GUI. And in step 186 the type of data protection is selected, e.g., Raid-1, Raid-S, or Raid-0, as discussed above. The adjustable PZV zone step 188 can be performed using screen area 514 (FIG. 13). A related Help function for this step or using this screen area may be invoked in step 190 which is discussed below with reference to FIG. 16. Step 192 "F" is explained with reference to FIG. 7 below. Continuation step 194 "C" flows into the FIG. 7—shown flow logic diagram.

Figure 7:
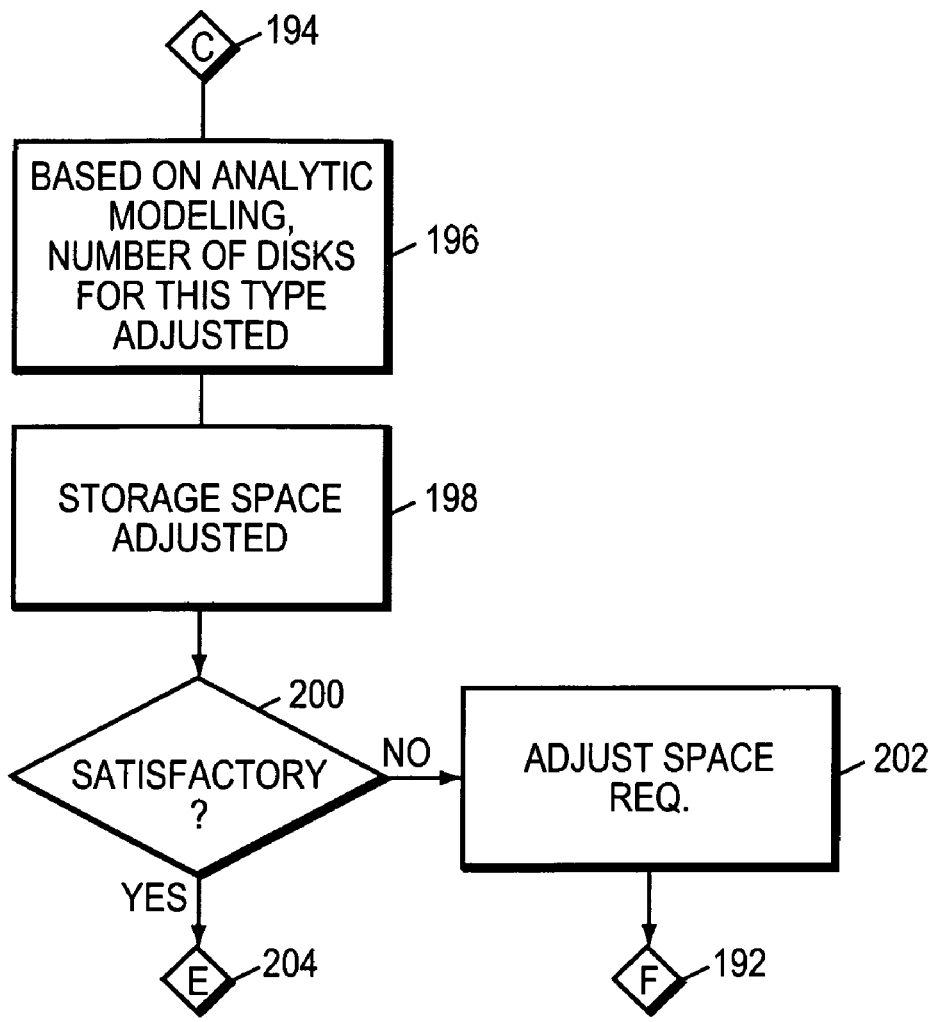
FIG. 7 is another flow logic diagram illustrating method steps of the invention carried out by the logic of this invention.

Referring to FIG. 7, step 196 provides the number of disks needed for the stratification based on analytical modeling. In step 198, the storage space is accordingly adjusted. If the space recommended is not satisfactory to the user than processing flows to step 202. In step 202, the user is allowed to adjust the space requirement and than processing flows into step 192 "F." If this is satisfactory to the user, then in accordance with answering "Yes" to the query in step 200 then processing flows to continuation step 204 "E," which flows into the FIG. 8—shown flow logic diagram.

Referring to FIGS. 15 and 17, an example of some user choices as described with reference to FIGS. 4–7 is now given. In this example 181 GB has been selected for disk type in screen area 512, a Performance Zone Value of 0.5 has been selected in screen area 514, and a protection scheme of Raid-1 has been selected in screen area 516 (FIG. 15). Such a scenario, would lead to an output of exemplary calculated results shown in FIG. 17 at user screen display area 526 and 528, respectively yielding 158 disks and usable space of 13.96 TB.

Continuing with this example and referring to FIGS. 18–19, the user may find this unacceptable and may adjust the minimum TB needed in screen area 520, for example, 18 TB as shown in FIG. 18. This will result in a new display of Screen area 526 and 528, respectively, of 204 disks and 18.03 TB (FIG. 19).

Figure 16:
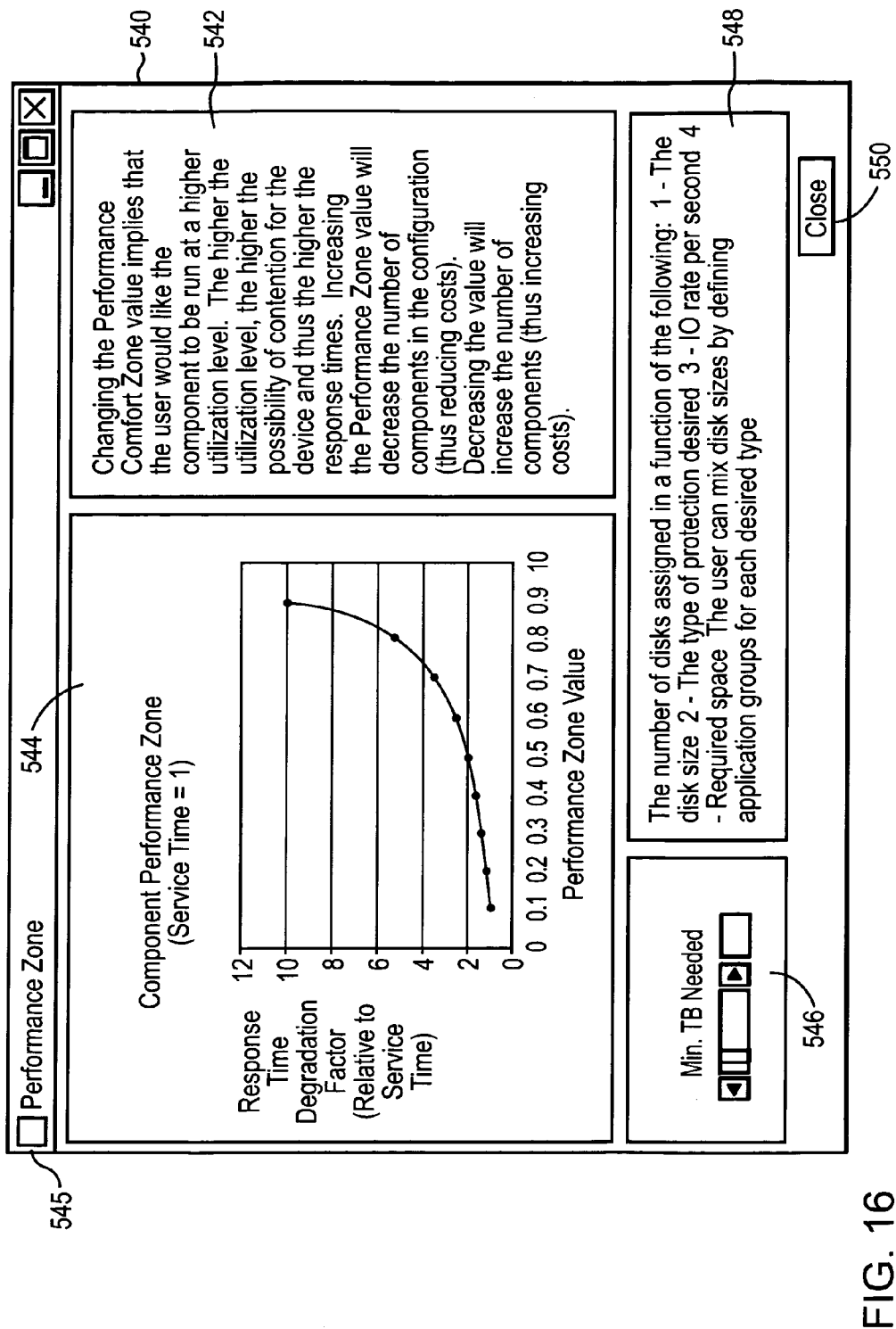
FIG. 16 is another exemplary representation of a user interface screen for using this invention.

Referring to FIGS. 15 and 16, if the user is new or otherwise requires help using the software tool of the invention, he may invoke Help by pressing screen area 522 displayed as a "?" button. He will then see a helpful presentation, for example such as FIG. 16 that shows screen 540 including a title area 545 (here entitled "Performance Zone," because that is where the user is working and the help is area specific). Screen Area 542 explains the relationship of the PZV and RTDF in economic and component terminology. In this example, help display area 544 shows the user the utilization that is a mathematic relationship used by the Logic of this invention. In this example screen area 546 explains the minimum storage space, here designated in TBIn area 548, for example it is explained to the user that "(t)he number of disks assigned as a function of the following: 1—the disk size; 2—the type of protection desired; 3—I/O rate per second; 4—required space; and the user can mix disk sizes by defining application groups for each desired type. The Close button 550 closes the Help function.

Figure 8:
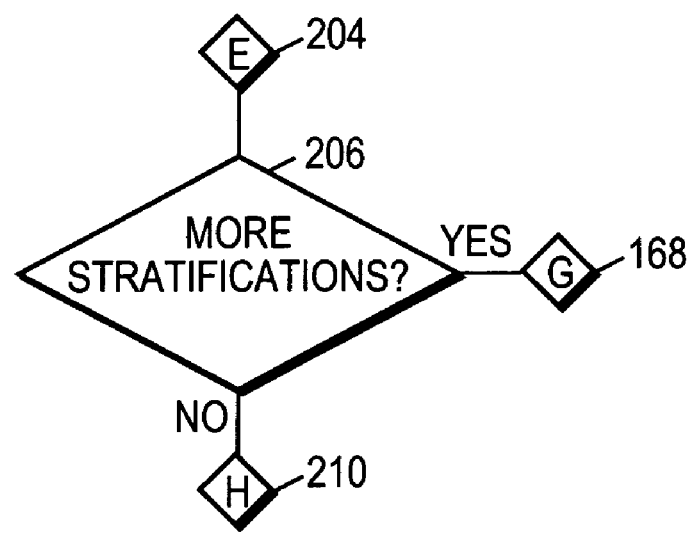
FIG. 8 is another flow logic diagram illustrating method steps of the invention carried out by the logic of this invention.

Referring to FIG. 8 and explanation of the method steps now continues. Continuation step 204 "E" flows into inquiry step 206. The inquiry is whether there are more stratifications to count. If "Yes," processing flows into step 168 "G." This flows back into the continuation of step G at 168 (acting, so to speak, as a "GO TO G") of FIG. 5. Processing then picks up again at Step 166 (FIG. 5) and continues disk counting by stratification, placing the answer for the stratification proceeding in the summary table shown at screen area 536 (FIG. 13). Such disk counting continues until the answer to query step 206 is "No." In this case processing flows into continuation step 210 "H," which flows into the FIG. 9—shown flow logic diagram.

Figure 9:
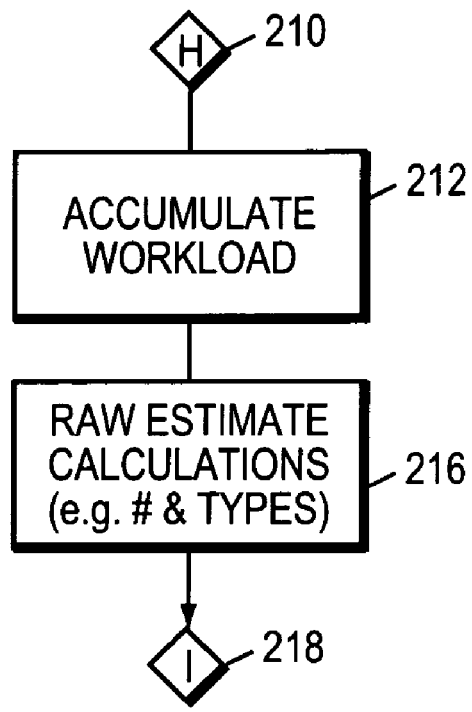
FIG. 9 is another flow logic diagram illustrating method steps of the invention carried out by the logic of this invention.

Referring to FIG. 9, once all the stratifications are accounted for the workloads are accumulated in step 212. The results placed in the Summary table in displayed at screen area 536 (FIG. 13). Raw estimate calculations based on this information, such as a number of disk and types thereof are given in step 216. Then, continuation step 218 "I" flows into the FIG. 10—shown flow logic diagram.

Every time the user presses "Include" at screen area 538 (FIG. 13) the summary table at screen area 536 gets updated with the entries of the new business unit. The first line in the summary table is the sum of each of the entries for that particular column. After all business units have been included the disk counting of the exercise is complete. The information from the disk calculations is then transferred to the Connections page via "Connectivity" tab 506 described below where the data storage system such as the preferred Symmetrix systems can be configured.

Figure 10:
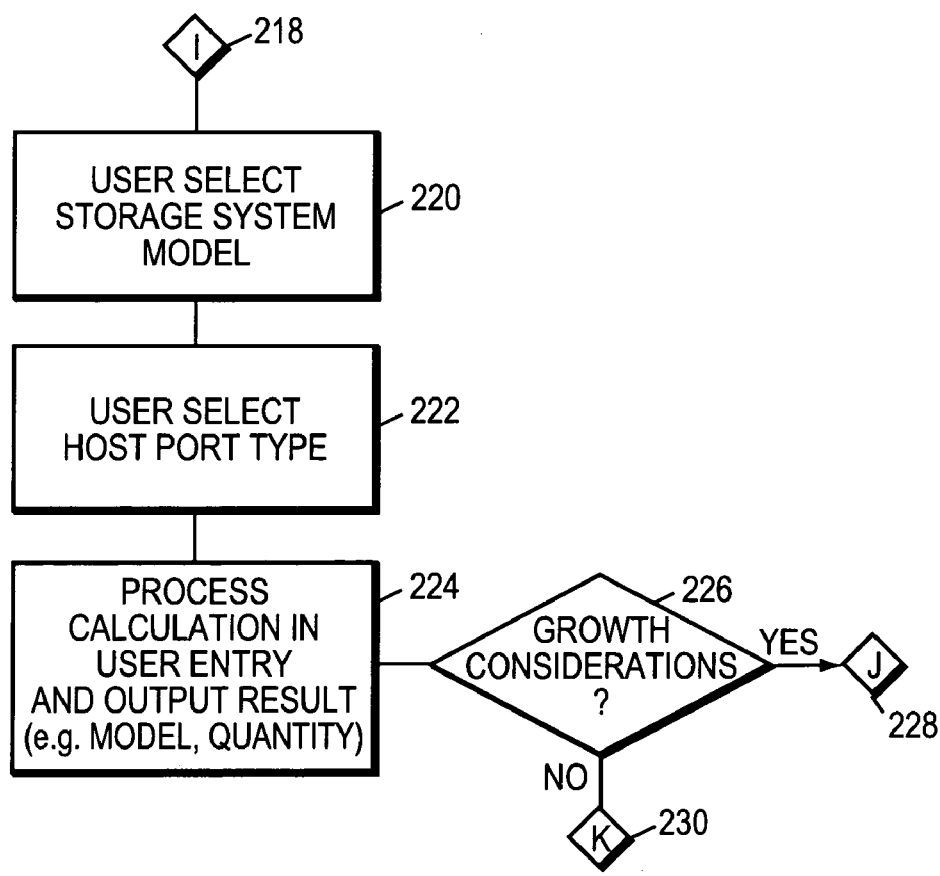
FIG. 10 is another exemplary representation of a user interface screen for allowing use of this invention.
Figure 20:
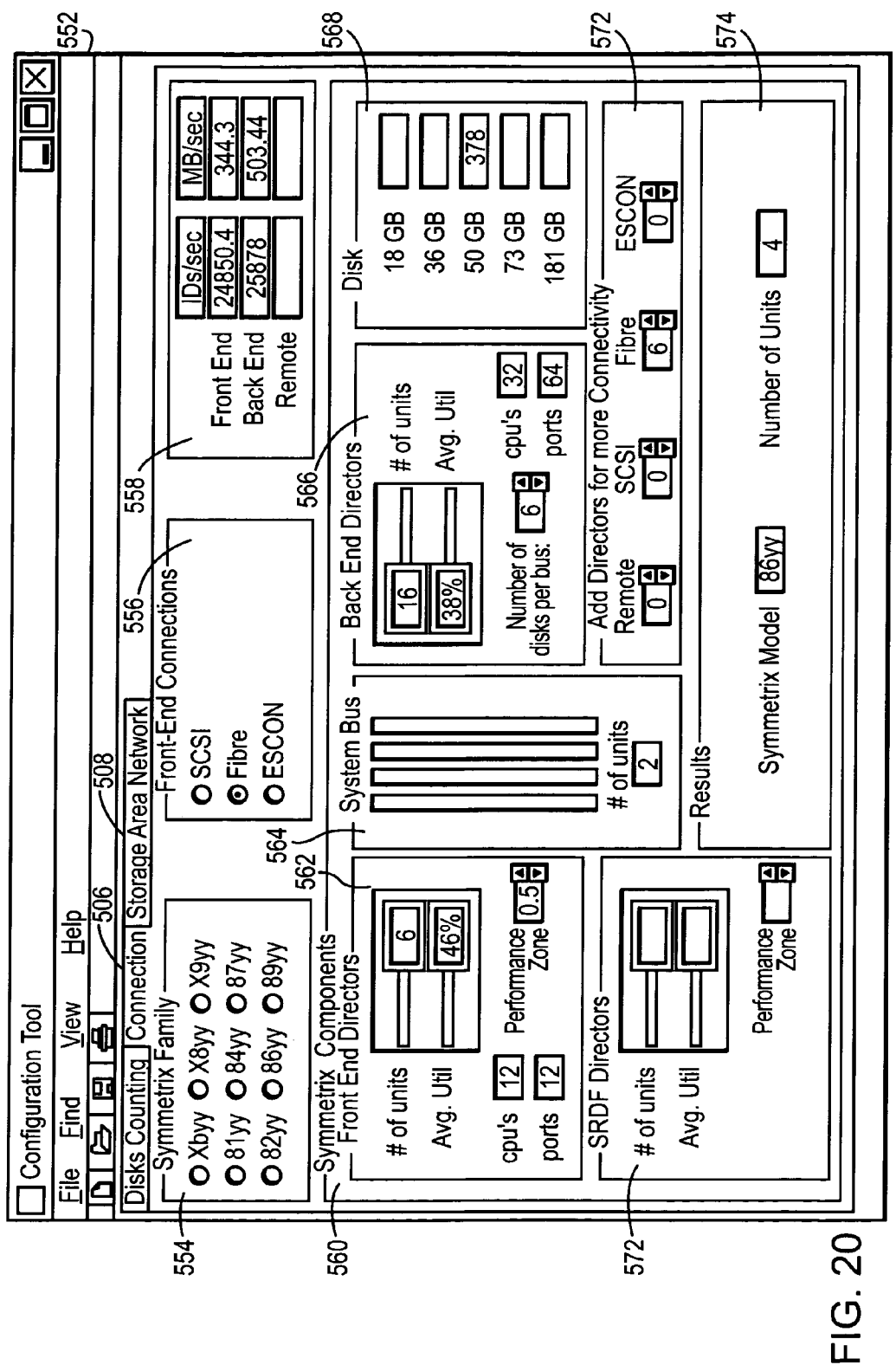
FIG. 20 is another exemplary representation of a user interface screen for using this invention.

Referring to FIGS. 10 and 20, the user may use the connectivity tab to then configure a data storage system, such as the preferred EMC Symmetrix system, based on the results. The user may select the appropriate model of data storage system in step 220 based in those presented in screen area 554 (FIG. 20). Based on the answers in the calculations the user is presented with the best choice for data storage system such as an EMC Symmetrix 86yy model. Next, in step 222, the user may select the host port type, for external connections, such as the well-known SCSI, or Fibre for Fibre for Channel or ESCON for a mainframe in screen area 556. Next, in step 224, the logic processing calculation in user entry gives an output result. Step 226 (FIG. 10) is an inquiry to determine if there are further data storage growth considerations for the user. If the answer is "No" processing flows to step 230 "K." if the answer is "yes" processing flows to continuation step 230 "J ", which flows into the FIG. 11—shown flow logic diagram.

Based on the user activity and calculations, a summary of the IO and throughput activity is presented from the Disk Counting page in the screen area 558. The logic of the invention calculates the amount of work done on the front-end and back-end of the data storage system, in this example, the preferred Symmetrix. Using these numbers together with configuration selections the number of Symmetrix is calculated and the number and type of front-end ports is presented. The user selection begins with the Symmetrix family and model that is desired in screen area 554. Next, the user selects front-end port types in screen area 556. The results are presented in screen area 574.

These results take into consideration the performance constraints of the various components of the Symmetrix within each family, calculate the number of components requires and determine the architecture of each preferred Symmetrix model and build the required number of machines for the prescribed workload. In addition, the user is able to modify the count of ports and directors in order to accommodate other needs such as redundancy, future growth or to account for uneven distribution of work, wherein the Logic compensates by calculating a totally balanced system. The number of back-end directors is calculated based on the number of required disks. There are physical limits to the number of disks that a back-end port can accommodate, depending on the preferred Symmetrix model. Sizing here is based on the maximum number of disks allowed per port.

In the preferred embodiment, for front-end directors the constraining components are the port and the CPU. Once again, utilization is presented as the maximum of either the port or the CPU. Generally speaking there is an inverse relationship between the two with respect to utilization. Large IO sizes dominate the port and as a result there are fewer of them and thus the utilization of the CPU is low. On the other hand, small IO sizes present the CPU with more activity but don't task the port as much. The user is able to adjust the maximum utilization level of the front end in a fashion similar to the disks.

As the number of front-end directors is calculated the value is transferred to the window in screen area 562. Here the user is able to manually add front-end directors of any type for reasons other than base performance sizing. The total of the directors in this window will then influence the total number of preferred Symmetrix systems configured.

Figure 11:
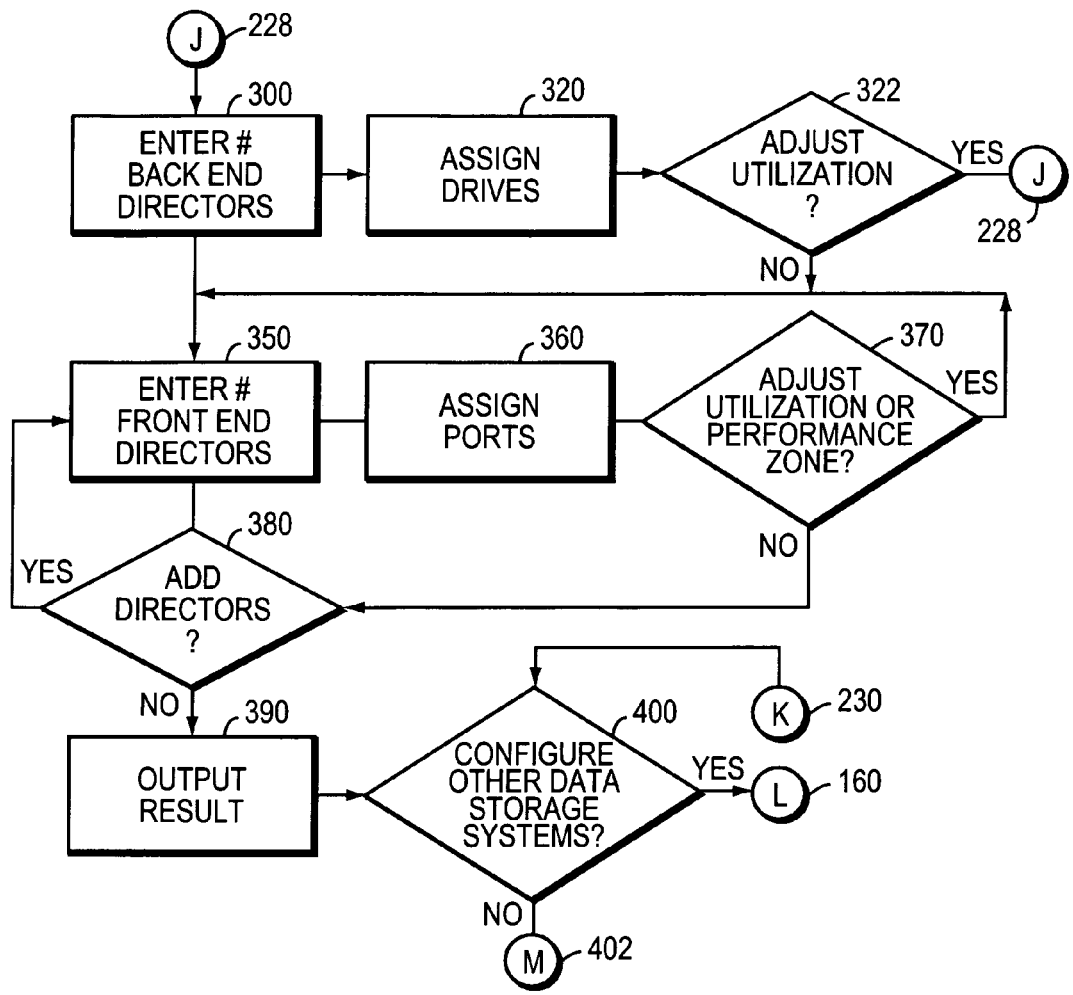
FIG. 11 is another flow logic diagram illustrating method steps of the invention carried out by the logic of this invention.

Referring to FIGS. 11 and 20, step 300 allows the user to adjust the number of disks attached to a BE port, thus, adjusting the number of end directors using screen area 566. In step 320 drives are assigned to the back end directors. Such drive assignments may be performed using screen area 566 and 568. The utilization may be adjusted in step 322, which is adjustable in screen area 566. If it is adjusted, then processing flows back again into step 300 for repetition of steps 300–322 until the answer is "No", in which case processing flows into step 350.

If it is not adjusted or adjustments are complete then in step 350 the user may enter the number of front-end directors in screen area 562. The number of ports may be assigned in step 360 also using screen area 562. The utilization of the Performance Zone may be adjusted in step 370. If either is adjusted, then processing flows back again into step 350 for repetition of steps 350–370 until the answer is "No," in which case processing flows into step 380.

If more FE directors are to be added per the query of Step 380, then processing flows back once again into step 350 for repetition of steps 350–370 until the answer is "No", in which case processing flows into step 380, and this loop is repeated until the number of directors is complete. The result is output to the user in step 390 via screen 552 (FIG. 20). Also the query step 400 may be reached via step 230 "K" which was based on a query posed in step 226.

Figure 12:
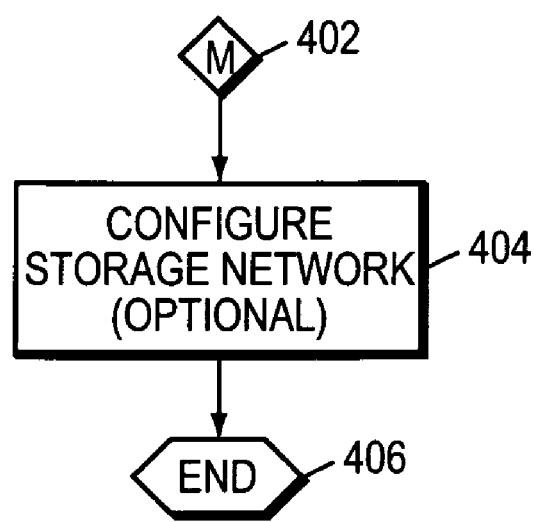
FIG. 12 is another flow logic diagram illustrating method steps of the invention carried out by the logic of this invention.

Reference is made to FIGS. 11 and 12 below. Referring again to FIG. 11, a query step 400 ponders whether other data storage systems are to be configured. If the answer is "Yes," then processing flows into step 160 "L" which in turn flows to step 158 (FIG. 4). The loop is continued until the answer to the query is "No," in step 402 "M" which continues to FIG. 12.

The user may use the data storage information in a cumulative fashion to configure storage networks using the "Storage Area Network" tab in which case other considerations including switches and gateways may also be considered (Step 404). The tool may of course include heuristic tools to adapt and learn to create solutions based on acquired processing and use. Processing ends in Step 406.

A system and method has been described for configuring one or more data storage systems based on a number of parameters. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

In the claims:

1. A method for configuring a data storage system, the method comprising the steps of:
   presenting a user interface;
   receiving information related to workload characteristics and performance characteristics through the user interface; and
   presenting storage configuration information for the data storage system that is based on these characteristics through the user interfaces;
   wherein the performance characteristics include read and write characteristics associated with data to be stored on the data storage system and the read and write characteristics include random read hit information.

2. The method of claim 1, wherein the storage configuration information includes information related to an amount of storage space associated with a quantity of disk drives for the data storage system.

3. The method of claim 2, wherein the information related to an amount of storage space associated with a quantity of disk drives is based at least in part on information about physical partitions on each disk.

4. The method of claim 1, wherein the workload characteristics include IO operations per unit of time.

5. The method of claim 1, wherein the read and write characteristics include random read misses information.

6. The method of claim 1, wherein the read and write characteristics include sequential reads information.

7. The method of claim 1, wherein the read and write characteristics include writes information.

8. The method of claim 1, wherein the information about performance characteristics is based at least in part on a user provided performance comfort zone value.

9. The method of claim 8, wherein the information about performance characteristics is based at least in part on information about a data protection scheme used with the data storage system.

10. The method of claim 9, wherein the data protection scheme is a Raid scheme.

11. A system for configuring a data storage system, the system comprising:
a computer having a memory and a display;
logic in memory, wherein the logic is configured for execution of the following steps:
presenting a user interface;
receiving information related to workload characteristics and performance characteristics through the user interface; and
presenting storage configuration information for the data storage system that is based on these characteristics through the user interface;
wherein the performance characteristics include read and write characteristics associated with data to be stored on the data storage system and the read and write characteristics include random read hits information.

12. The system of claim 11, wherein the storage configuration information includes information related to an amount of storage space associated with a quantity of disk drives for the data storage system.

13. The system of claim 12, wherein the information related to an amount of storage space associated with a quantity of disk drives is based at least in part on information about physical partitions on each disk.

14. The system of claim 11, wherein the workload characteristics include IO operations per unit of time.

15. The system of claim 11, wherein the read and write characteristics include random read misses information.

16. The system of claim 11, wherein the read and write characteristics include sequential reads information.

17. The system of claim 11, wherein the read and write characteristics include writes information.

18. The system of claim 11, wherein the information about performance characteristics is based at least in part on a user provided performance comfort zone value.

19. The system of claim 18, wherein the information about performance characteristics is based at least in part on information about a data protection scheme used with the data storage system.

20. The system of claim 19, wherein the data protection scheme is a Raid scheme.

21. A program product for configuring a data storage system, the program product including a computer readable tangible medium with logic configured for causing the following computer-executed steps to occur:
presenting a user interface;
receiving information related to workload characteristics and performance characteristics through the user interface; and
presenting storage configuration information for the data storage system that is based on these characteristics through the user interface;
wherein the performance characteristics include read and write characteristics associated with data to be stored on the data storage system; and
wherein the read and write characteristics include random read hits information.

22. A method for configuring a data storage system, the method comprising the steps of:
presenting a user interface;
receiving information related to workload characteristics and performance characteristics through the user interface;
presenting storage configuration information for the data storage system that is based on these characteristics through the user interface;
wherein the performance characteristics include read and write characteristics associated with data to be stored on the data storage system; and
wherein the read and write characteristics include random read hits information.

23. The method of claim 22, wherein the read and write characteristics include random read misses information.

24. The method of claim 22, wherein the read and write characteristics include sequential reads information.

25. The method of claim 22, wherein the read and write characteristics include writes information.

26. The method of claim 22, wherein the storage configuration information includes information related to an amount of storage space associated with a quantity of disk drives for the data storage system.

27. The method of claim 26, wherein the information related to an amount of storage space associated with a quantity of disk drives is based at least in part on information about physical partitions on each disk.

28. A system for configuring a data storage system, the system comprising:
a computer having a memory and a display;
logic in memory, wherein the logic is configured for execution of the following steps:
presenting a user interface;
receiving information related to workload characteristics and performance characteristics through the user interface; and
presenting storage configuration information for the data storage system that is based on these characteristics through the user interface;
wherein the performance characteristics include read and write characteristics associated with data to be stored on the data storage system; and
wherein the read and write characteristics include random read hits information.

29. The method of claim 28, wherein the read and write characteristics include random read misses information.

30. The method of claim 28, wherein the read and write characteristics include sequential reads information.

31. The method of claim 28, wherein the read and write characteristics include writes information.

32. The method of claim 28, wherein the storage configuration information includes information related to an amount of storage space associated with a quantity of disk drives for the data storage system.

33. The method of claim 32, wherein the information related to an amount of storage space associated with a quantity of disk drives is based at least in part on information about physical partitions on each disk.

* * * * *